United States Patent [19]

Astle

[11] Patent Number: 4,587,520
[45] Date of Patent: May 6, 1986

[54] CURSOR CONTROLLED PAGE SELECTION IN A VIDEO DISPLAY

[75] Inventor: Brian Astle, Cranbury, N.J.

[73] Assignee: RCA Corporation, Princeton, N.J.

[21] Appl. No.: 482,852

[22] Filed: Apr. 7, 1983

[51] Int. Cl.$^4$ ............................................. G09G 1/16
[52] U.S. Cl. .................................... 340/712; 340/709; 340/710
[58] Field of Search ............... 340/712, 709, 710, 708, 340/703, 365 VL

[56] References Cited

U.S. PATENT DOCUMENTS

| | | | |
|---|---|---|---|
| 3,482,241 | 12/1969 | Johnson | 340/712 |
| 4,028,695 | 6/1977 | Saich | 340/709 |
| 4,167,729 | 9/1979 | Christenson et al. | 340/709 |
| 4,213,189 | 7/1980 | Mueller et al. | 340/703 |
| 4,232,311 | 11/1980 | Agneta | 340/703 |
| 4,354,184 | 10/1982 | Worborschil | 340/712 |
| 4,479,197 | 10/1984 | Haag et al. | 340/712 |
| 4,495,491 | 1/1985 | Postl | 340/709 |

Primary Examiner—Marshall M. Curtis
Attorney, Agent, or Firm—Eugene M. Whitacre; Joseph J. Laks; Sammy S. Henig

[57] ABSTRACT

A teletext system in which viewer function selection is accomplished by superposing a cursor on one of the displayed function words. The teletext/videotext receiver includes a ROM for storing page selection control symbols and a RAM for storing symbols and related addresses corresponding to all displayed page selection symbols. The RAM contents are compared with a cursor address signal to identify displayed page selection symbols that are at or near the cursor location. A page selection symbol, thus identified, is transferred from the RAM to the teletext/videotext system decoder as an information selection command in response to depression of a selection key whereby a minimum number of keys provide selection of a virtually unlimited number of system commands and a user may continuously monitor the displayed text while making selections thus reducing selection entry errors. Provision is made for altering the cursor position, shape and/or brightness upon a predetermined condition of proximity of the cursor with respect to a displayed system command symbol to verify the validity of the command to the user and to avoid positional ambiguities of the cursor relative to the displayed symbol.

6 Claims, 4 Drawing Figures

CURSOR CONTROLLED PAGE SELECTION IN A VIDEO DISPLAY

FIELD OF THE INVENTION

This invention relates to teletext, videotext and similar systems and particularly to control arrangements for accessing or selecting desired system information to be displayed to a user of the system.

BACKGROUND OF THE INVENTION

Teletext systems have been proposed for transmitting information to users having television receivers equipped with decoders which store selected "pages" of the information and display the stored information in the form of alpha-numeric or graphical character symbols on the screen of the television receiver. The information is conveyed by means of pulse code modulation (PCM) of the luminance signal during a selected line (or lines) of the vertical interval so as not to be visible to the user when viewing regular television programming. Such systems are "one-way" in the sense that the information is continuously transmitted and the user identifies portions of the transmission to be stored and displayed. Videotext systems are similar but employ two-way transmissions via telephone lines or other suitable data links to communicate the user's information selection code to the information provider. In both types of systems the user must create and communicate a data selection code to the system.

To facilitate user selection of the information to be displayed in teletext systems, it has been proposed to transmit so-called "menus" of information available in the teletext system databse. A menu may include a listing of available "pages" or topics of information within the system. Identification of specific user selectable items on a menu may be provided by means of specific words or characters. For example, a magazine page might be identified by a specific page number and a command function might be identified by a specific word (e.g., "NEXT" meaning "fetch the next page", "MORE", etc.).

It has been suggested that user selection of teletext menu items be provided by means of a keyboard having keys with labels or symbols corresponding to the "committed" vocabulary of the teletext service. The vocabulary might include numerical digits for page entry, numerical digits followed by a special prefix or suffix (e.g., a pound sign #) for menu selection items and numerical digits followed by a asterisk (*) to denote magazine numbers. Control or command words under consideration include "NEXT" and "MORE". Videotext systems, having direct communication with the information provider, may be expected to have a more extensive vocabulary.

Control of a teletext decoder using a keyboard and the foregoing control vocabulary could be provided, illustratively, by fourteen (14) keys, ten for the numbers 0–9, two for the pound (#) and asterisk (*) symbols and two more for the "commands" NEXT and MORE. Some manufacturers, however, might elect to provide a fewer number of keys (e.g., 12 keys) by omitting the NEXT and MORE keys and letting those commands be represented by double keystrokes (e.g., ** or ##). On the other hand, other manufacturers might elect to provide more than fourteen keys to allow for additional control functions such as 'ERASE', 'INDEX', 'CAPTION', 'BACK', etc.

SUMMARY OF THE INVENTION

The present invention resides in part in recognizing that a need exists for a teletext or videotext information selection control system that is adaptable to all present and future information selection requirements.

The invention resides in a further part in recognizing the shortcomings and disadvantages of utilizing keyboard information selection systems which are not readily adaptable to changes in control symbol syntax.

The invention resides also in recognizing the need for an information selection system which is "human engineered" in the sense that selection errors are minimized to the greatest extent possible. In particular, it is herein recognized that conventional keyboard systems, of the type wherein each key is "dedicated", so to speak, to a unique command or control indicia, tend to become cluttered as the system vocabulary becomes more complex. This keyboard clutter, in turn, tends to create a "distraction factor" in proportion to the number of keys on the keyboard. The system user must divert his or her attention from the display, hunt for the appropriate key, make the deisred entry and again focus on the screen.

It is, therefore, an object of the invention to provide an information selection control system which is adaptable to varied control protocols, which does not require a large number of dedicated keys and which minimizes the aforementioned distraction factor by enabling an untrained user to continuously monitor the system display while entering system choices or commands.

In accordance with the invention, a teletext/videotext information selection system for use in a video receiving apparatus of the type having a decoder means and a display means comprises a memory means such as for a read-only memory storing specified information selection symbols. A processor means, coupled to the decoder means and to the memory means, stores the addresses of displayed symbols corresponding to the information selection symbols. A cursor means supplies cursor video signal to the display means and provides a cursor address at an output thereof. A comparing means coupled to the processor means and to the cursor means provides an information selection code identifying each stored information symbol having an address proximate the cursor address within predetermined vertical and horizontal limits. A circuit means couples the information selection code to input means of the decoder means and causes the decoder means to select information for display in accordance with the code in response to an information selection enable signal supplied thereto.

In accordance with a further aspect of the invention, the comparing means provides an alteration of the appearance of the cursor upon a predetermined condition of proximity.

In accordance with another aspect of the invention, the comparing means, upon the occurrence of a given proximity condition, causes an alteration of the cursor address as displayed on the display means.

BRIEF DESCRIPTION OF THE DRAWING

The invention is illustrated in the accompanying drawing wherein like elements are identified by like designators and in which.

DETAILED DESCRIPTION

Figure 1:
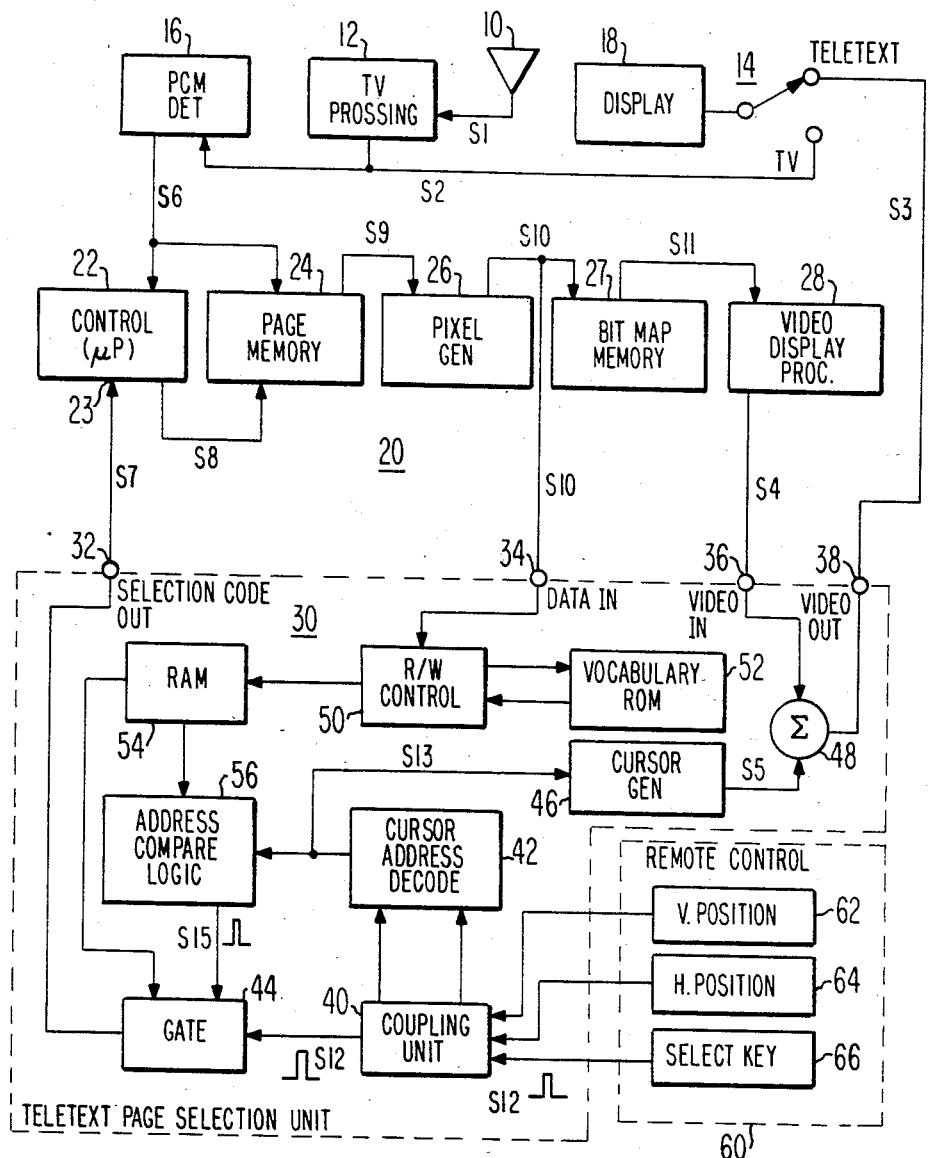
FIG. 1 is a detailed block diagram of a television receiver embodying the invention.

The receiver of FIG. 1 comprises an antenna 10 for receiving a broadcast television signal S1 having a teletext component. Signal S1 is applied to a television signal processing unit which includes a tuner and associated circuits for providing a baseband video output signal S2 that is applied to a switch 14 and to a pulse code modulation (PCM) detector 16. For normal viewing of entertainment programming, switch 14 is placed in the "TV" position of coupling signal S2 to a display unit 18 (e.g., a kinescope and associated drive circuitry). For teletext viewing, switch 14 is placed in the "Teletext" position (as shown) for coupling a teletext video output signal S3, processed in accordance with the invention, to display unit 18.

The signal S3 comprises a teletext video component S4 produced by a teletext decoder 20 and a cursor video component S5 produced by a teletext page selection unit 30. Decoder 20 is of conventional design and comprises PCM detector 16 which detects luminance signal level variations of the baseband signal S2 and provides a digital output signal S6 representative of teletext information transmitted during a selected line (or lines) of the vertical interval of signal S2. Signal S6 is supplied to a control unit 22 (e.g., a microprocessor) and to a page memory 24. Unit 22 has an input port 23 coupled to an output port 32 of page selection unit 30 for receiving a selection code signal S7. In response to the selection code S7, unit 22 supplies a write enable signal S8 to memory 24 which causes pages of information conveyed by signal S6 and which correspond to the selection code to be stored in memory 24. The user controls the selection code, as will be explained, and thus controls what portions of the information conveyed by signal S6 are stored in memory 24 and ultimately displayed on unit 18.

The information stored in memory 24 may receiver further processing by control unit 22 to place it in a desired form for display purposes (e.g., the "pages" may be reordered or reformatted, overlays may be added and so forth). When the pages are in a form for display, memory 24 is "read" by control unit 22 and a teletext data signal S9 is applied to pixel (picture element) generator 26 which translates signal S9 to form appropriate character and graphic symbols representative of the stored page information. A typical graphic/character display format might comprise, illustratively, a 6×10 array of bits for each character or graphic symbol. The translated symbol signal S10 produced by pixel generator 26 is stored in a bit map memory 27.

Memory 27 is the principal means for refreshing display unit 18 during the teletext operating mode. Illustratively, memory 27 may be organized to provide storage of 21 lines of symbols with 42 symbols per line and four bits per symbol added to convey color or brightness information. The stored symbols (alphanumerics and graphaics, for example) are read from memory 27 at video rates in a timed relationship with the scanning of display 18 to provide an output signal S11 conveying the stored teletext information in raster scan form. Signal S11 is applied to a video display processor 28 which translates the digital signals to a video format (analog) in which each pixel and its associated color are represented by appropriate luminance and chrominance components to thereby form the teletext video output signal S4. Signal S4, as previously noted, is combined with the cursor signal S5 for display of the teletext information on unit 18.

Teletext page selection unit 30 provides the functions of generating the cursor signal S5 and the teletext page selection code S7 in accordance with proximity of the cursor with certain predefined symbols displayed on unit 18. The selection unit comprises an output port 32 coupled to the input port of control unit 22 for supplying the selection code thereto, and input port 34 coupled to the output of pixel generator 26 for receiving the teletext data signal S10 (i.e., symbols and display addresses) therefrom, an input terminal 36 coupled to the output of video display processor 28 for receiving the teletext video signal S4 therefrom and a video output terminal 38 coupled to switch 14 for supplying the composite teletext video and cursor signals thereto (i.e., signal S3).

The cursor control signal is initiated and controlled by means of a remote control unit 60 comprising a vertical position control 62, a horizontal position control 64 and a select key 66. Unit 60 may comprise, illustratively, a "joy stick" type of control wherein controls 62 and 64 are potentiometers providing analog output voltages proportional to the joy stick position and wherein key 66 is a push button switch. Alternatively, unit 60 may comprise other suitable means for providing vertical and horizontal control and selection signals such as a "track ball", a "mouse", a simple key pad or the like.

The output signals of remote control 60 are applied to a coupling unit 40 which conditions the signals for use by an address decoder 42 and a gate 44. Unit 40 may comprise a sonic or infra-red transmission system or the like. Where, as assumed, control 60 comprises a joy stick, unit 40 would include analog to digital conversion means for converting the output voltages of the vertical and horizontal position controls to digital signals. The "select signal" S12, being produced by a switch closure, need only be translated in unit 40 to an appropriate logic level for use by gate 44.

The cursor address signal S13 is applied to a cursor generator unit 46 which receives vertical and horizontal timing information from display unit 18 and generates a cursor video signal S5 in timed relationship with scanning of the display. (To simplify the drawing, raster scan timing signals are not shown). The cursor, symbol, illustratively, may be of block form or of some other suitable shape so as to be visible when displayed with the teletext video signal. The cursor signal S5 is added to the video signal S4 by means of an adder 48 which supplies the resultant combined signals S3 to display 18 via switch 14.

Generation of the selection code signal S7 involves determination of the proximity of the cursor to specific displayed teletext symbols which represent user choices of information to be displayed. To facilitate this, the teletext data signal S10 is applied to a read/write control unit 50 which is coupled to a "vocabulary" read only memory (ROM) 52 and to a random access memory (RAM) 54. Vocabulary ROM 52 is programmed with data corresponding to the "working vocabulary" of the control symbols in the teletext system syntax (i.e., number and control words or symbols corresponding to user information access or control commands). Unit 50 compares the teletext data at port 34 with the contents of ROM 52 and if there is a match stores in RAM 54 the identities and addresses of all teletext control symbols which are displayed on unit 18. RAM 54 must have sufficient data which does not correspond to a recognized control symbol (or word) is not stored in RAM 54 but is simply ignored by unit 50.

The addresses of the data stored in RAM 54 are continuously compared with the cursor address provided by decoder 42 by scanning through the memory addresses of RAM 54 by scanning means (not shown) to produce symbol address information which is supplied to address compare logic unit 56. Any control data in RAM 54 having an address equal to or within a predetermined vertical and horizontal range of the cursor address will cause logic unit 56 to supply a priming signal pulse S15 to gate 44. If, at the same time, the user has depressed select key 66 in remote control 60, the select signal S12 will cause gate 44 to transfer the control code from RAM 54 to the teletext selection code input port 23 of control unit 22 in the teletext decoder 20. Unit 22, in turn, will interpret the selection code and load page memory 24 with teletext information in accordance with the selection code and the information will be processed and displayed on unit 18 as previously described.

The "proximity" feature of the invention with regard to the address comparison provided by logic unit 56 enables the user to err to a certain extent in the placement of the cursor on the screen of display unit 18. It is only necessary for the user to place the cursor near the desired page or menu selection symbol to effect the desired control function. An examplary comparison range is 5 scan lines vertically and 16 "pixels" horizontally. The use of a range of values for address comparison frees the user from any need to exactly position the cursor over a desired control function word or symbol and greatly enhances the speed and ease of use of the selection system.

Figure 2:
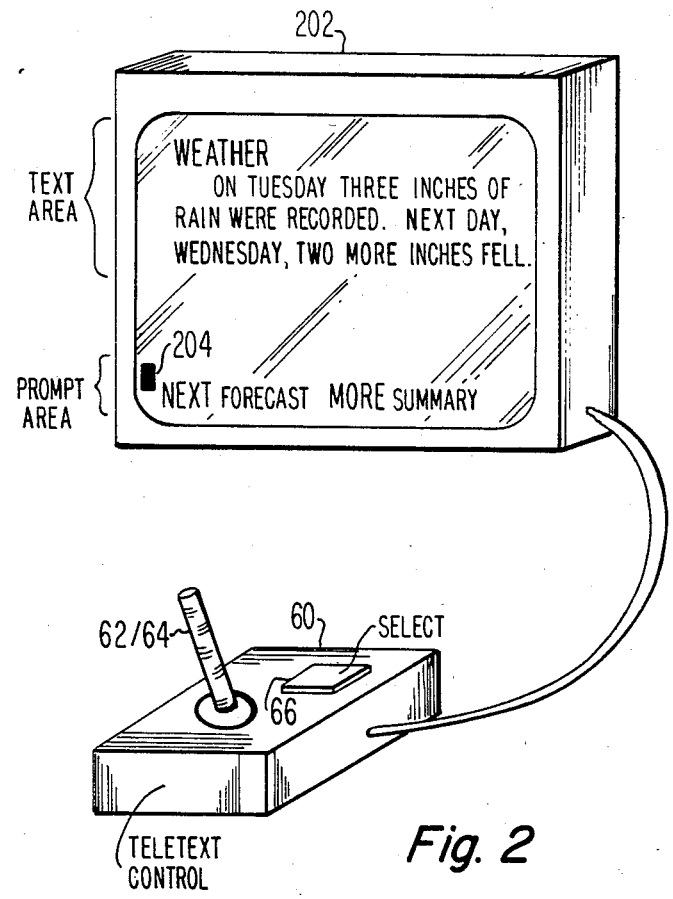
FIG. 2 is a perspective view of the receiver of FIG. 1 illustrating certain aspects of operation of the invention.
Figure 3:
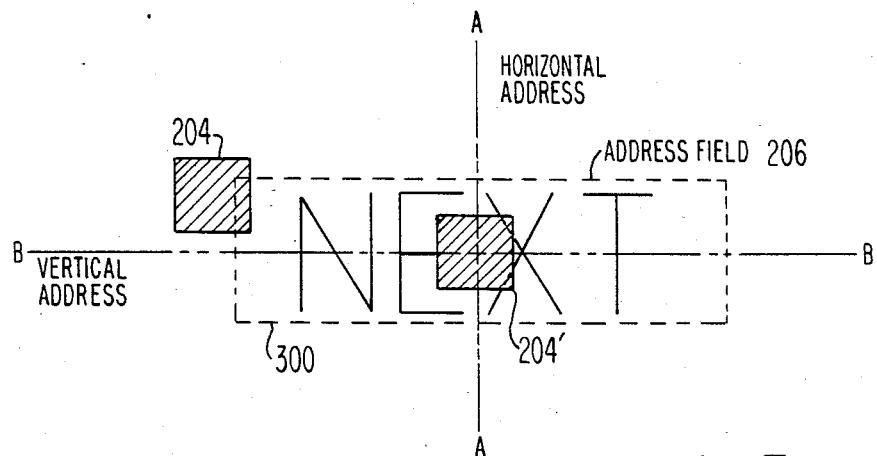
FIG. 3 is a display representation of the receiver of FIG. 1 illustrating the address proximity effect of the invention.

FIGS. 2 and 3 provide further illustration of the operation of the teletext page selection unit of the invention. In FIG. 2 a television receiver 202 equipped with a teletext decoder and a page selection unit as described in shown in operation displaying a page of weather information transmitted via teletext. The remote control unit 60 is of the joy stick type previously described. The text of the weather report is seen to include the words "next" and "more". These words are also control words in the teletext system vocabulary and appear in the prompting area at the bottom of the screen. In this example, the control word NEXT, when selected as a system command will cause the next forecast to be displayed. The control word MORE will cause a summary to be displayed.

Selection of the controls or commands NEXT or MORE may be made by placing the cursor 204 close to the desired word either in the text area or in the prompt area of the displayed message. This is done by manipulation of the joy stick 62/64. When cursor is positioned near the desired word, the user depresses the select push button switch 66 and the control system will implement the choice as previously described. If the cursor should be misplaced then depression of switch 66 will have no effect since gate 44 will not be primed by signal S15 unless the cursor is near a recognized "command" word in the system vocabulary stored in ROM 52.

FIG. 3 provides a more detailed view of the proximity of the cursor 204 to the command word NEXT. The center of the word is defined by a vertical line AA corresponding to a horizontal address and a horizontal line BB corresponding to a vertical address. An address field is formed corresponding to all addresses falling within five scan lines vertically and sixteen pixels horizontally of the intersection of AA and BB. If the cursor address equals any member of the address feild 206 when switch 66 is activated, then gate 44 will transfer the command code for "NEXT" to control unit 22 for effecting the control function so identified.

To further facilitate selection of control functions by means of a cursor, the system of FIG. 1 may be modified so as to place cursor 204 in the center of the selected word "NEXT" whenever the generated cursor address lies within any portion of the address field 206. This is illustrated by the position of the cursor 204' in FIG. 3 which is centered with respect to lines AA and BB. In this mode of control the cursor 204, in effect, "jumps" to the center of any word in the command vocabulary of the teletext system when the cursor address is within the address field of the word. This provides a positive indication to the user that he has placed the cursor on a system command word (or other symbol) and thus eliminates any doubt as to what function will be implemented when switch 66 is depressed. Additionally, to provide a further indication that a given symbol corresponds to a particular page or menu selection code (or some other function) the cursor appearance may also be altered after the cursor jump to a code symbol location. It is also possible to alter the appearance of the displayed word or symbol as will be explained.

Figure 4:
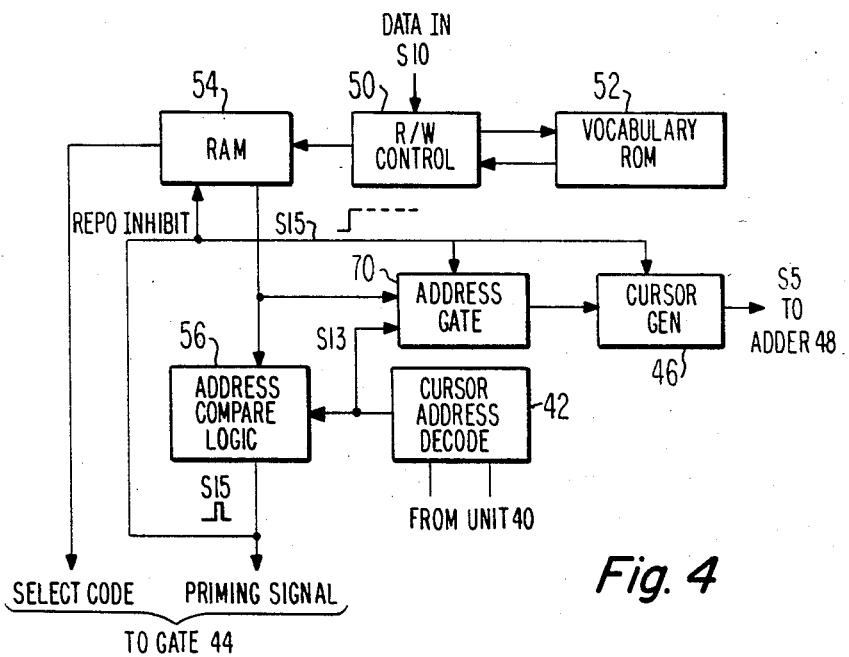
FIG. 4 is a block diagram illustrating certain modifications of the receiver of FIG. 1.

FIG. 4 provides an illustration of how the cursor jump and appearance alteration may be implemented by modifying the page selection unit of FIG. 1. The modification comprises the addition of an address gate 70 having inputs coupled to the address information output lines of RAM 54 and decoder 42 and an output coupled to supply selected ones of the addresses to cursor generator 46. Gate 70 is controlled by the signal S15 which indicates proximity of the cursor address to the displayed information address. When signal S15 is low, indicating that the cursor is not near a control symbol, gate 70 couples the cursor address S13 to cursor generator 46 which functions as previously described to cause the cursor to be displayed at the address produced by the remote control unit 60. However, when signal S15 is high (indicating proximity of addresses) gate 70 couples the address of the control symbol produced by RAM 54 to the cursor generator thereby causing a "jump" of the displayed cursor to the symbol address. This jump is illustrated in FIG. 3 by the position of cursor 204' which, as shown, is centered with respect to the control symbol (word) NEXT. To prevent the RAM address from changing after the "jump" signal, signal S15 is applied to an address change inhibit input 55 of the RAM. Accordingly, as long as there is no change in the cursor address signal, S15 will remain high and the cursor will remain centered on the control symbol. If the cursor address changes by an amount such that the true address is outside the address field 206 then signal S15 will go low and the cursor will "jump" to its actual address as determined by signal S13.

To highlight the cursor mode (i.e., its true address versus its RAM controlled address), the signal S15 is applied to a luminance level control input of the cursor generator 46. The generator may include an interruptor or modulator responsive to the signal S15 for altering the cursor luminance signal level thereby causing the cursor to blink when in the RAM addressing mode. This provides a further alert to the user of the system that the cursor is properly positioned with respect to the control word (or other control symbol). In the alternative (or in addition) to blinking the cursor, the cursor generaator 46 may include suitable shape altering circuitry responsive to signal S15 for providing a visible alteration of the appearance of the cursor when in the RAM address control mode. The shape alteration may comprise a change from a "block" cursor (as shown in FIG. 3) to an underline cursor, for example. Another alternative would be to alter the appearance of the displayed word or symbol by applying the signal S15 to decoder 20 to effect a video reversal or other change.

It will be appreciated that the principles of the invention are of general utility and may be applied to videotext as well as to teletext systems and to other systems in which a control symbol vocabulary is defined and used to facilitate system information selection or some other control function. The various control functions in the information selection unit may be combined and executed by different structure than that shown. For example, a microprocessor, suitably programmed in accordance with the invention, may be used for providing the RAM read/write control functions as well as the ROM comparison function and the address comparison function and the cursor address decoding function. The remote control 60 may comprise a simply joy stick as discussed or some other means such as a three key keyboard having up/down and left/right rocker type keys plus a "select" key.

What is claimed is:

1. An information selection and control system for use in a video receiving means having an information decoder means and a display means that displays at a corresponding location on said display means a given information selection legend included in a predetermined plurality of information selection legends, said display means being capable of displaying a cursor that can be positioned on said display means at a location selected from any of a plurality of locations that includes at least a location that is in proximity to said location of said given information selection legend and at least a location that is not in proximity to said location of said given information selection legend, said system comprising:

(a) memory means for storing said plurality of predetermined information selection legends wherein each legend comprises a corresponding information selection command;

(b) processor means coupled to said information decoder and to said memory means for storing information selection legends and related addresses that are displayed on said display means and that are included in said plurality of predetermined information selection legends;

(c) cursor means for supplying a cursor video signal to said display means to display said cursor thereon and for providing a cursor address signal that is indicative of the location where said cursor is positioned on said display means;

(d) comparing means coupled to said processor means and responsive to said cursor address signal for providing an information selection signal that identifies association between said cursor and said give information selection legend when the location of said cursor on said display means is at said location that is in proximity to said location of said given information selection legend so that when the location of said cursor is not in proximity to said location of said given information selection legend, said information selection signal is not provided, said comparing means also supplying an information selection code that is representative of the value of said given information selection legend;

(e) means responsive to said information selection signal for providing a user with a positive indication that said cursor is associated with said given information selection legend;

(f) means responsive to a user initiated command that is initiated by said user in response to said positive indication, for supplying an information enable signal; and (g) circuit means for coupling said information selection code to input means of said decoder means and responsive to said information selection enable signal supplied thereto for causing said decoder means to select, in accordance with said code information that is to be displayed next on said display means.

2. An information selection and control system as recited in claim 1 further comprising remote control means having a source for providing a cursor control signal manifestation and a key for providing said information selection enable signal; and coupling means for coupling said information control signal manifestation to said cursor means for forming said cursor address signal and for coupling said information selection enable signal to said circuit means.

3. An information selection and control system as recited in claim 1 wherein said positive indication providing means comprises means for altering the location of said cursor upon occurrence of the condition of said proximity.

4. An information selection and control system as recited in claim 1 wherein said positive indication providing means comprises means for changing the cursor brightness upon occurrence of the condition of said proximity.

5. An information selection and control system as recited in claim 1 wherein said positive indication providing means comprises means for changing selected dimensions of said cursor upon occurrence of the condition of said proximity.

6. An information selection and control system as recited in claim 1 further comprising means for altering the displayed appearance of said given information selection legend proximate said cursor.

* * * * *